W. V. TURNER.
FLUID PRESSURE BRAKE.
APPLICATION FILED MAR. 25, 1916.
1,251,137.
Patented Dec. 25, 1917.
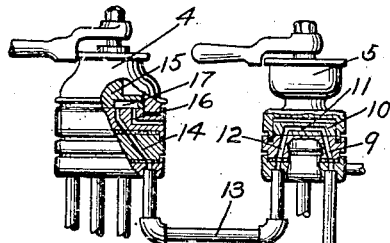
Fig. 1.
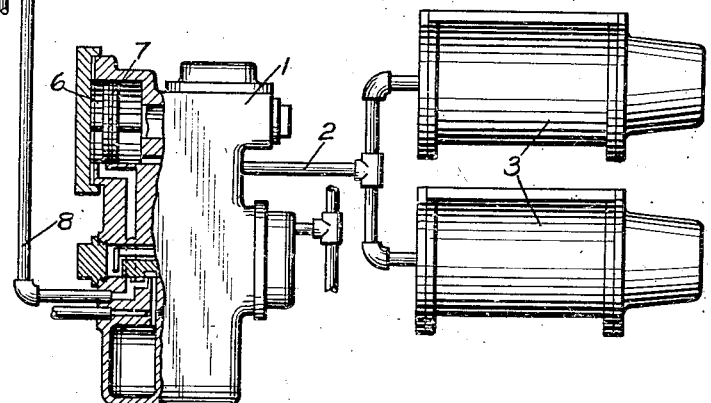
Fig. 2.
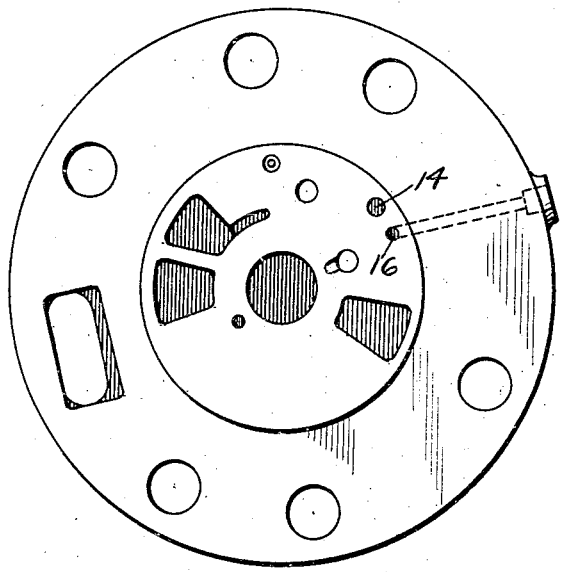
Fig. 3.
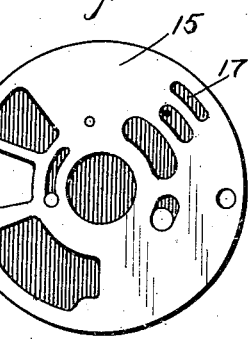
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,251,137.  Specification of Letters Patent.  Patented Dec. 25, 1917.

Application filed March 25, 1916. Serial No. 86,619.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a locomotive brake equipment of the type shown in my prior Patent No. 1,109,715, dated September 8, 1914.

With a locomotive brake equipment of the above character, the locomotive brakes may be controlled independently of the train brakes and two brake valves are provided for that purpose, one an automatic brake valve and the other an independent brake valve, by manipulation of which fluid under pressure may be directly supplied to and released from the application piston chamber of a so-called distributing valve device which controls the admission and release of fluid to and from the locomotive brake cylinders.

In the running position of the independent brake valve, the application piston chamber of the distributing valve is connected to a port in the automatic brake valve which is open to the exhaust in the running position of the automatic brake valve but is closed in the full release and lap positions.

When a two application stop is made, it is necessary, particularly on long trains, to move the automatic brake valve to full release position when releasing after the first application, in order to insure the full recharge of the brake pipe and then the brake valve is turned to lap position, so as to provide time for the auxiliary reservoirs throughout the train to equalize with the brake pipe, as otherwise, if a second application of the brakes should be attempted, the auxiliary reservoirs might not be fully recharged and the second brake pipe reduction might not be sufficient to provide the necessary differential pressure between the auxiliary reservoir and brake pipe to effect the movement of the triple valves to application position.

If the brake valve is manipulated in this manner, by moving the brake valve to full release and then to lap position after the first application, it will be noted that the locomotive brakes are not released, since the release pipe from the locomotive distributing valve is closed at the automatic brake valve in full release and lap positions, and as a consequence, when a second application of the brakes is made, a high brake cylinder pressure is developed in the locomotive brake cylinders, which is undesirable, as it may cause wheel sliding and shocks.

The principal object of my invention is to overcome the above difficulty, and for this purpose an additional exhaust port is provided in the rotary valve seat of the automatic brake valve which is adapted in lap position to be connected to the release pipe of the distributing valve device.

In the accompanying drawing, Figure 1 is a diagrammatic drawing, partly in section, of a portion of a locomotive brake equipment, showing my invention applied thereto; Fig. 2 a plan view of the rotary valve seat of the automatic brake valve; and Fig. 3 a face view of the rotary valve.

In Fig. 1 of the drawing is shown a portion of a locomotive brake equipment comprising a distributing valve device 1 connected by pipe 2 to the locomotive brake cylinders 3, an automatic brake valve 4, and an independent brake valve 5.

The usual piston chamber 6 containing the application piston 7 of the distributing valve device is connected by a pipe 8 to a port 9 in the independent brake valve, which leads to the seat of rotary valve 10 and in the running position of the independent brake valve, as shown in Fig. 1, a cavity 11 in the rotary valve connects the port 9 with a port 12 leading to pipe 13 which is connected to a port 14 in the automatic brake valve 4 leading to the seat of rotary valve 15.

The above described arrangement is the same as that heretofore employed and according to my invention, in addition to the usual ports and cavities in the automatic brake valve device, a port 16 is provided in the rotary valve seat which leads to the atmosphere and a cavity 17 is provided in the rotary valve 15, so positioned that when the rotary valve is turned to lap position, the cavity 17 will connect port 14 with port 16.

It will now be apparent that in operation, if the automatic brake valve is turned to lap position in making a two application stop after the brake valve is turned to full release position, the pipe 8 will be connected to the atmosphere, and since fluid is vented from the application cylinder 6, the application piston 7 will be shifted to release position, and the locomotive brakes will be released in the usual manner.

As shown in Fig. 2, the exhaust port 16 is led to the atmosphere at a convenient point, so that when the locomotive brake release function is not desired, the port may be plugged up.

Having now described my invention, what I claim as new and desire to secure by Letters Patent, is:

1. In a fluid pressure brake, the combination with a brake pipe, of an independent pipe for controlling the locomotive brakes and a brake valve device for effecting a reduction in brake pipe pressure to cause an application of the brakes and having means for venting fluid from said independent pipe in lap position in which all other ports are closed to thereby effect the release of the locomotive brakes.

2. In a fluid pressure brake, the combination with a brake pipe, a reduction in pressure in which effects an application of the locomotive and train brakes, of a valve device on the locomotive having a chamber a reduction in pressure in which effects the release of the locomotive brakes and a brake valve device for effecting a reduction in brake pipe pressure and having means for venting fluid from said chamber in lap position to thereby effect the release of the locomotive brakes.

3. In a fluid pressure brake, the combination with a brake pipe, a reduction in pressure in which is adapted to effect an application of the brakes on the locomotive and train, of a distributing valve device on the locomotive having an application cylinder, a reduction in pressure in which effects the release of the locomotive brakes, an independent brake valve for controlling the pressure in said chamber, and an automatic brake valve for effecting a reduction in brake pipe pressure and controlling a port communicating with said chamber when the independent brake valve is in running position and having means for connecting said port to the atmosphere in the usual lap position.

4. In a fluid pressure brake, the combination with a brake pipe, of an automatic brake valve device for effecting a reduction in brake pipe pressure and having means for effecting the release of the locomotive brakes in the usual lap position in which all other ports are closed.

In testimony whereof I have hereunto set my hand.

WALTER V. TURNER.

Copies of this patent may be obtained for five cents each, by addressing the "Commissioner of Patents, Washington, D. C."